March 22, 1949.　　　M. HATTAN　　　2,464,808
SELF-LOCKING NUT
Filed Feb. 12, 1944
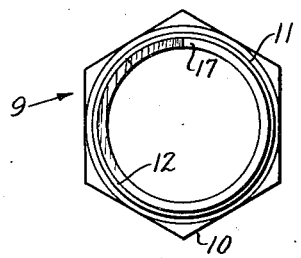
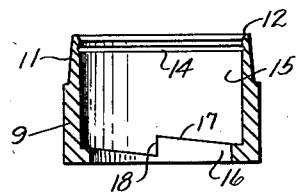
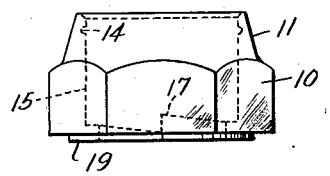
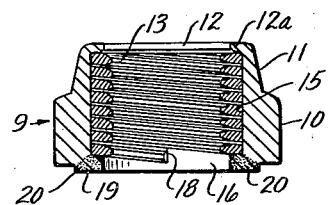
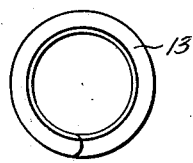
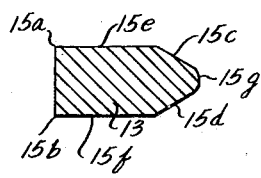
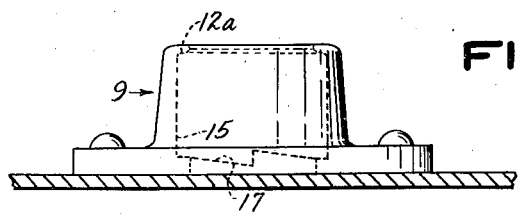
INVENTOR
MARK HATTAN
BY
*Joseph Th. Hazell*
*Wade Koontz* ATTORNEYS Patented Mar. 22, 1949

2,464,808

UNITED STATES PATENT OFFICE 2,464,808

SELF-LOCKING NUT

Mark Hattan, Dayton, Ohio

Application February 12, 1944, Serial No. 522,081

7 Claims. (Cl. 151—21)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to lock nuts, and among other objects, aims to provide:

(1) A constant torque self-locking nut;

(2) A lock nut which may be used and reused many scores of times without reservicing and with practically no loss in efficiency;

(3) A nut whose torque is easily adjustable or variable during manufacture;

(4) A lock nut whose locking action is distributed over substantially the entire length of the nut so that the stress at any one point is minimized;

(5) A nut which cannot be cross threaded on a bolt or stud;

(6) A lock nut which is made of relatively inexpensive materials and employing, if desired, two different metals or metal alloys, one for the body, the other for the thread;

(7) A lock nut which is more easily manufactured and at a higher production rate than present type self-locking nuts;

(8) A lock nut requiring no change whatever in the bolt or stud and no substantial increase in over-all dimensions of the nut itself, hence is of minimum weight;

(9) A lock nut which will withstand stresses of such magnitude as will strip the threads of the bolt to which the nut is applied, yet may be made to yield before the bolt in case this is desirable;

(10) A lock nut requiring no taps for its manufacture, nor a cut thread, hence permitting the use of certain metals and materials which are extremely difficult to tap;

(11) A lock nut which is practically unaffected by variances in bolt diameter;

(12) A lock nut so made that it can not scrape off the cadmium or other rust-proof plating applied to bolts;

(13) A lock nut which may be removed from the bolt, in case it freezes on, without damage to the bolt;

(14) A lock nut which can withstand almost any operating temperature, without failure or loss of efficiency;

(15) A lock nut whose operating efficiency is substantially unaffected by oil;

(16) A nut of differential strength and hardness, with the greatest strength where subjected to the highest stresses; and

(17) A lock nut which is easily applied and removed without special tools or operations,

(18) A lock nut which is especially resistant to loosening by vertical vibrations.

The above and other objects and advantages will be understood after referring to the following detailed description of a preferred embodiment of the invention, taken in connection with the accompanying drawings, in which:

Fig. 1 is a top plan view of the nut body per se;

Fig. 2 is a side elevation of the same;

Fig. 3 is a half section;

Fig. 4 is a half section of the nut body with the locking spring in normal position;

Fig. 5 is an enlarged elevation of part of the locking spring per se;

Fig. 6 is an end elevation of the spring of Fig. 5 on a smaller scale;

Fig. 7 is an enlarged cross section through the wire which forms the locking spring; and Fig. 8 is a cross section through a plate or anchor nut embodying the invention.

Referring particularly to the drawings, the preferred form of self-locking nut comprises a casing, shell, barrel or body 9 whose exterior side walls may be formed into a hexagon 10 for a portion of the length of the nut, and may have a plain, slightly frusto-conical portion 11 for the remainder of the length. The circular edge 12 of the frusto-conical portion is preferably chamfered and is adapted to be turned in by a spinning operation to form an annular abutment, rim or locking flange 12a (Fig. 4) for holding the continuous coiled locking spring 13 after its insertion into the nut body. To facilitate the spinning, a groove 14 is cut in the inner walls 15 of the nut casing. The spring snugly fits within the smooth, cylindrical walls 15. At its opposite end, the nut casing has an annular flange or shoulder 16 of uniform width but formed on its upper surface 17 with a forming tool to provide a uniformly helical abutment for the end of the coiled locking spring. The helical surface 17 is of substantially the same dimensions and pitch as the locking spring and provides a step 18 parallel to the axis of the nut, against which one extremity of the coil spring 13 may press, under certain conditions. It will be clear that the locking spring is permanently secured within the body of the nut by the two abutments 12a, 16 at opposite ends but is unanchored. The spacing of these two abutments is, however, sufficient to allow a little play or helical creeping of the coil spring within the casing. This movement, in a ½ in. nut, need only be a few thousanths of an inch. During the formation of the shoulder 16, e. g. by cold pressing, an annular seat 19 is formed, said seat being shown as projecting from the bottom of the nut, although it need not do so. Cold pressing greatly increases the strength of the nut in the zone where the greatest stresses occur, and much higher loads may be imposed without failure. This zone of increased strength where the material of the nut casing is of a denser structure and the flange or shoulder 16 is hardened and strengthened is indicated by the stippling 20 in Fig. 4.

The locking spring may be formed from stainless steel, spring carbon steel or Phosphor bronze wire, preferably music wire, and preferably has a minimum of six convolutions, greater strength however being obtained when eight convolutions are used as shown in Fig. 4. The wire is wound as tight as possible, with no gaps, and its lower extremity is preferably rounded, while its upper end is ground off at right angles to the axis of the coil. The wire previous to coiling is formed as shown in Fig. 7 by drawing it through a die or rollers; this cold drawing increases the tensile strength of the wire to about 395,000 p.s.i. Referring to Fig. 7, the wire 13 has two substantially square corners 15a, 15b, and a pair of converging or beveled faces 15c, 15d at an angle of 30° to the faces 15e, 15f, respectively. Joining the beveled faces is a narrow, slightly convex face 15g. In cross section, the wire may be described as an oblong to one of the shorter sides of which a trapezoid is attached. If preferred, the beveled faces may be rolled to a point. The form of faces 15c, 15d and 15g is such that the inside of the spring forms a standard thread for engagement with standard threads or bolts or studs. The center line of each wire section is preferably square with the axis of the coiled spring, although other dispositions of the wire are possible.

Referring to Fig. 5, the several convolutions of the spirally coiled wire each have a plurality of vertical deformations, waves or bends 21, there being preferably three or four of these waves in each convolution. For a ½ in. nut, the maximum deflection of a wave (measured on a line parallel to the axis of the spiral) from the normal spiral shape of the wire may amount to .005 in. where the overall diameter of the coil of wire does not exceed .6045 in. The waves in the several convolutions occur at the same angular positions, so that the several vertical waves nest, as shown in Fig. 5. The purpose of these waves is to provide a locking grip on the bolt or stud, the locking grip arising from the fact that the conventional bolt threads straighten out the waves when the nut is threaded on the bolt. As there are at least six and preferably eight convolutions of wire in each nut, and as each convolution has at least three and preferably four waves, there will be at least eighteen and preferably thirty-two areas on the inside of the nut where the resilient waves are straightened out by assembling the nut on a bolt. The reaction of the spring wire so straightened on the bolt threads effects a secure gripping of the threads. As the waves are formed in permanently resilient wire, any straightening of the waves is only temporary, and as soon as the nut is removed from the bolt, the waves resume their original form.

When the described nut is threaded on a bolt or stud, there will be a slight spiral shifting or helical creeping of the coiled wire, this shifting taking place in the direction of flange 16 when the nut is being screwed on, and in the direction of abutment 12a when the nut is being unscrewed. It has been found that this slight movement of the coiled wire is indispensable to the proper functioning of the nut, because the increase in the length of the coiled wire as the waves flatten or straighten out must be accomodated. The deformations or waves are easily formed in the wire as it is coiled.

It has been proposed in Patent No. 1,228,671 to E. R. Hibbard, dated June 5, 1917, to provide a nut lock in the form of a flat or flanged washer whose central aperture is provided with a radial slot and a single thread having waves or deformations at several points, these waves being flattened (i. e., made to assume the form of segments of a helix) when the nut lock is tightened on a bolt. However, the thread is integral with the nut and hence is anchored throughout its length, therefore cannot shift or move helically, and vertical flexing of the waved or deformed portions is necessarily resisted by the body of the nut and can only take place to a very limited extent along the inner (unanchored) edge of the thread.

In contrast with the structure disclosed in said Hibbard patent, I provide a lock nut which distributes the locking action over almost the entire length of the nut. The starting torque is low and once the nut is fully on the bolt the torque remains constant, which is believed to be a unique characteristic of nuts embodying the invention. As the torque is constant, the user can be sure the nut is in proper condition to lock. There is no variation in torque from 150 in. lb. down to 10 in. lb. in fifteen removals as with other lock nuts which wear out rapidly in use. Less injuries to personnel are likely due to the constant torque feature. If desired, however, the torque can be varied (in different nuts) by varying the deformation of the wire as it is coiled. Furthermore, it is contemplated that the wave at the bolt-receiving end of the nut may be of zero amplitude, so that the nut starts on the bolt with almost no torque. If desired, the wave amplitudes may increase uniformly from zero at the bolt-receiving end to a maximum at the other end, which would give rise to maximum torque at the end of the nut-assembling operation.

The invention is advantageous because the nut may be made of an inexpensive steel casing (which is easily spun) enclosing a beryllium copper or Phosphor bronze or other corrosion-resisting wire, where the high expense of a solid stainless steel nut is unwarranted. High strength music wire suitable for use in the nuts may be purchased for twenty cents a pound and from one pound of wire the threads for 60 to 70 one-half inch nuts may be made. It is far easier to coil wire and insert it in the nut bodies than to cut threads in certain metals; such metals may therefore be used for the forming of the wire insert, which may be even stainless steel. Inserts of stainless steel should cost less than one cent per nut of the one-half inch size. Instead of metal, certain plastics may be used to form the body of the nut where the load on the nut is light and the saving in weight is important. Another advantage is that the end of the wire will not engage with the bolt unless it enters the bolt thread, whereas the tapered end of the thread of an ordinary nut may cross the tapered thread end of a bolt to cause permanent injury to both parts. As the spring locking action is effective over thirty-two areas (in the preferred form), there is no danger of the spring wire being stressed at any point near to its elastic limit. Because drawn wire is used for the thread on the nut, the thread is much smoother than if it were cut. The close fit between the walls of the casing and the spring insures a strong grip by the spring on the casing when loads are applied, due to the radial component of force provided by the 30° angles on the thread faces. This radial component tends to expand the coil in the casing, thus causing the casing walls to take a considerable portion of the tension load on the nut. Whatever load is thus carried by the casing walls will not be carried by the base, which is obviously advantageous.

Actual tests show that a nut made as described may be screwed on and removed from a bolt more than 100 times without loss in locking efficiency. Use of the nuts will therefore effect great savings in production and in stocked parts (inventory) and will greatly reduce maintenance of all sorts of equipment and machinery. According to Army-Navy specifications, a one-half inch 20 lock nut must withstand a tension of 21,110 pounds. Nuts embodying my invention have withstood from 23,000 lb. up to 29,000 lb., when the threads on the bolts were stripped, leaving the nuts in good condition, ready for reuse. The invention has all the advantageous features mentioned above, and others, as will be understood by those skilled in the art.

Obviously many changes within the scope of the appended claims may be resorted to. The above detailed description is not to be construed as limiting the invention to the precise construction described and shown.

What I claim is:

1. A lock nut comprising a shell or casing having a smooth-walled interior; a generally helical multi-coil tightly coiled unanchored wire spring enclosed within the shell or casing and having its exterior snugly fitting within but free of any attachment to the smooth walls and having its interior so shaped that it may be threaded on a bolt or stud; an annular shoulder formed integrally with the casing at the upper end and extending inwardly to provide an abutment for the spring; and another annular shoulder formed integrally with the casing at the lower end and extending inwardly to provide an abutment for the corresponding end of the spring; said shoulders embodying means to prevent independent complete rotation of the spring and casing; the majority of the convolutions of the spring being continuous having at least one vertical wave or wave-like deformation, the spring being of material so resilient that the deformations all tend to flatten out when the nut is threaded on a bolt or stud, the flattened out deformations then gripping the threads of the bolt to hold the nut thereon, said deformations however automatically returning to their initial shape when the nut is removed; the spring being of such dimensions that it may creep to a limited extent in a helical path between the two spaced shoulders, when the nut is screwed on or off a bolt.

2. A lock nut comprising a shell or casing having a smooth-walled interior; a generally helical continuous, multi-coil tightly coiled unanchored wire spring enclosed within the shell or casing and having its exterior snugly fitting within but free of any attachment to the smooth walls and having its interior so shaped that it may be threaded on a bolt or stud; an annular shoulder formed integrally with the casing at the upper end and extending inwardly to provide an abutment for the spring; and another annular shoulder formed integrally with the casing at the lower end and extending inwardly to provide an abutment for the corresponding end of the spring; the lower shoulder having its upper surface formed as a single turn of a helix of substantially the same diameter and pitch as the spring, and adapted to seat the lower end of the spring, the lower extremity of the spring abutting the step formed by the ends of the single turn of the helix; the majority of the convolutions of the spring having at least one vertical wave or wave-like deformation, the spring being of material so resilient that the deformations all tend to flatten out when the nut is threaded on a bolt or stud, the flattened out deformations then gripping the threads of the bolt to hold the nut thereon, said deformations however automatically returning to their initial shape when the nut is removed; the spring being of such dimensions that it may creep to a limited extent in a helical path between the two spaced shoulders, when the nut is screwed on or off a bolt.

3. The invention according to claim 1, wherein the lower shoulder is the upper portion of an annular seat which is integral with the casing; the annular seat and lower shoulder being in a zone of greatly increased strength, as compared with the remainder of the casing.

4. A lock nut comprising, in combination, a hollow casing having inwardly extending shoulders at the top and bottom; and a continuous, multi-coil, unanchored spiral spring of closely coiled wire inserted in the hollow casing and bearing against both shoulders and the interior walls of the casing; said shoulders embodying means to prevent independent complete rotation of the spring and casing; said spiral spring wire being so fitted in the casing that it may have a slight helical creep and having an internal shape such that it may be threaded on a bolt or stud; the majority of the convolutions of the spring each having at least one vertical wave-like deformation; each such deformation being partly spiral longitudinally and the amplitude of the deformation being measurable in a direction parallel to the axis of the spiral spring.

5. The invention according to claim 4, wherein the deformations of adjacent convolutions nest; each deformation being equal in amplitude to all the others.

6. The invention according to claim 4 wherein the cross section of the wire of which the spring is coiled has a flattened outer portion; each deformation being equal in amplitude to all the others; the deformations of adjacent convolutions nesting without gaps between the flattened cross-sectional wire portions.

7. A lock nut comprising, in combination, a casing having a substantially cylindrical inner surface and a pair of inturned flanges at the top and bottom; and a generally helical spring wire coil interposed between the flanges and in contact with said cylindrical inner surface; the inner surfaces of the convolutions of the spring wire coil being so shaped that the nut may be threaded on the threads of a bolt or stud; the convolutions having waves or deformations so shaped and of such dimensions as to grip the threads of the bolt or stud to lock the nut thereon; said casing being hardened in the area or zone adjacent the bottom flange and throughout the bottom flange, so that failure of said flange under the reactions imposed thereon when the nut is tightened is obviated.

MARK HATTAN.

No references cited.